March 18, 1952     M. H. EMRICK     2,589,486
INDEXING MECHANISM
Filed Feb. 11, 1949     2 SHEETS—SHEET 2
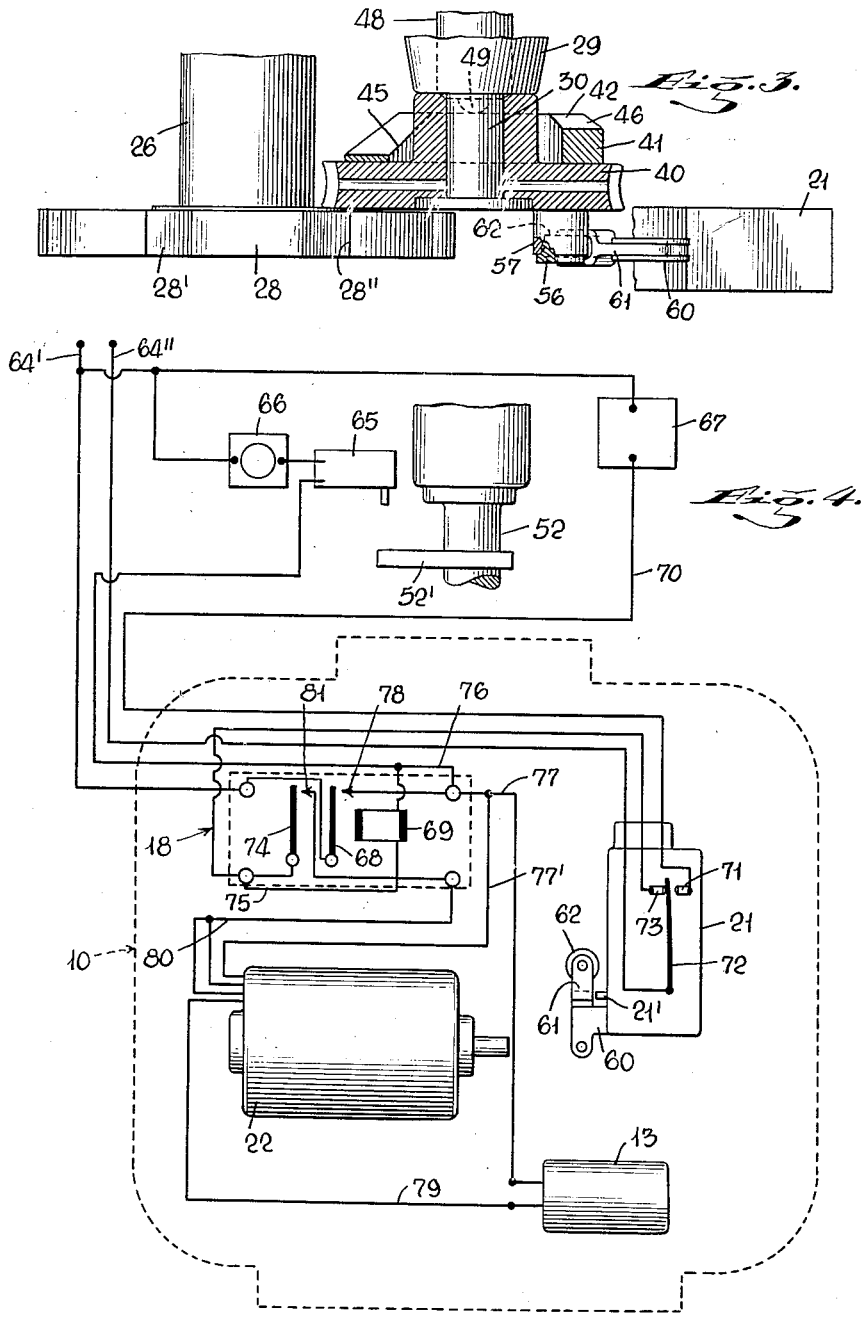
INVENTOR
MELVIN H. EMRICK Patented Mar. 18, 1952

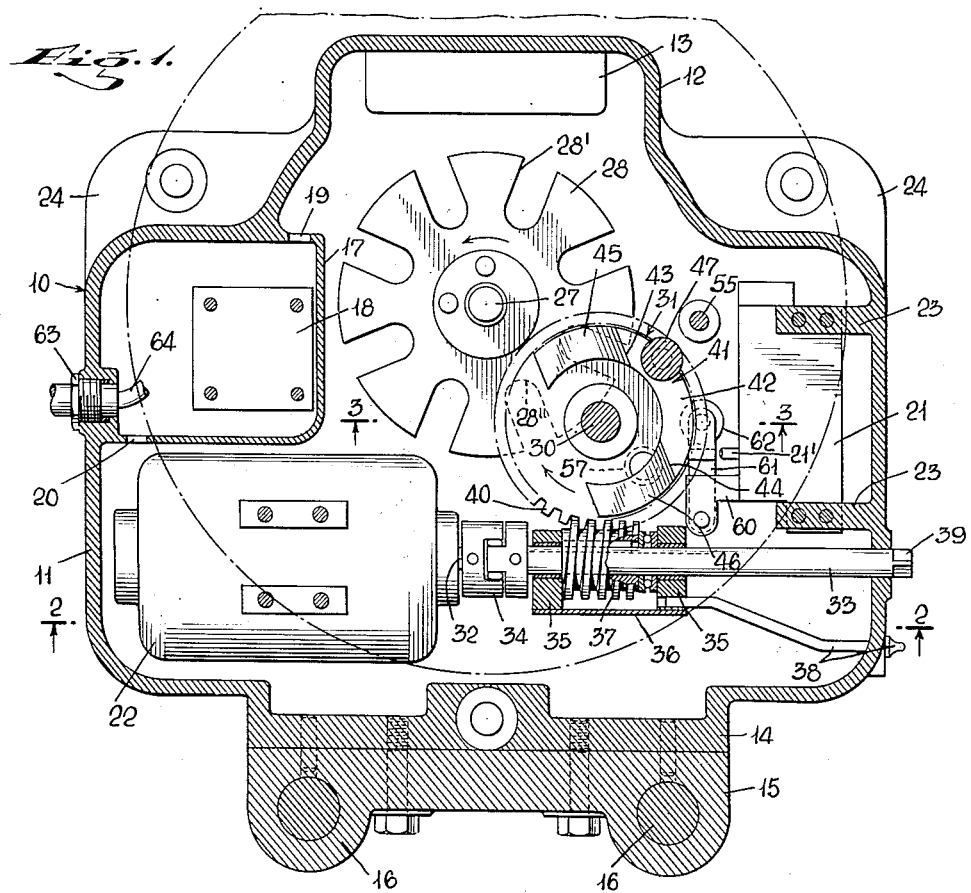

2,589,486

UNITED STATES PATENT OFFICE 2,589,486

INDEXING MECHANISM

Melvin H. Emrick, Jamaica, N. Y.

Application February 11, 1949, Serial No. 75,770

7 Claims. (Cl. 90—56)

This invention relates to index fixtures for use in conjunction with various types and kinds of machines for intermittently positioning a workpiece or series of workpieces in a machine, in automatically performing one or more operations on the workpiece or workpieces. More particularly, the invention deals with a fixture of the character described which is electrically and automatically actuated and controlled by movement of a forming or shaping tool with respect to a workpiece indexed by the fixture. Still more particularly, the invention deals with a fixture of the character described in the form of a unitary assemblage facilitating mounting of the same in connection with machines of various types and kinds.

The novel features of the invention will be best understood from the following descriptions when taken together with the accompanying drawings, in which certain embodiments of the invention are disclosed, and in which the separate parts are designated by suitable reference characters in each of the views; and in which:

Fig. 1 is a sectional plan view of a fixture made according to my invention, omitting electric wiring employed.

Fig. 2 is a section substantially on the line 2—2 of Fig. 1, with parts of the construction broken away and in section.

Fig. 3 is a section on the line 3—3 of Fig. 1, showing part of the construction in elevation; and Fig. 4 is a diagrammatic view illustrating the wiring diagram.

To illustrate one adaptation of my invention, I have shown in Figs. 1 and 2, a unitary casing 10 for housing the mechanism of my automatic electric index fixture. The casing is open at the bottom, as seen in Fig. 2 of the drawing, and is defined by side walls 11 of the general cross-sectional contour shown in Fig. 1, the walls having an offset portion, as seen at 12 for support of a capacitor 13. Another offset wall 14 is opposed to the wall 12 and to this latter wall is secured a bracket 15 for support of guide rods 16 to position the fixture in a machine. The left side of the casing 10, as seen in Fig. 1, has a box-shaped compartment 17 in which is disposed an electric relay mechanism diagrammatically shown at 18 in Fig. 4 and blankly outlined in Fig. 1.

The compartment 17 has openings 19 and 20 through which circuit wires extend to the capacitor 13, a micro-switch 21 and an electric motor 22. The micro-switch 21 is supported in a bracket portion 23 in the casing at the right side thereof, as seen in Fig. 1. The lower portion of the casing has flange portions 24 at the corners thereof, for additional mounting in connection with the table or base-plate of a machine. The top of the casing has a rather heavy supporting plate 25, note Fig. 2, in connection with which the motor 22 is hung, the plate having a bearing portion 26 for a shaft 27 of a geneva type indexing element 28. The top 25 of the casing also has a depending bearing portion 29 for the shaft 30 of a drive unit 31.

A motor shaft 32 is coupled with a worm gear shaft 33 to a flexible coupling 34. The shaft 33 is mounted in another depending fork-shaped bearing 35 having a partial housing 36, note Fig. 1, for retention of lubrication therearound, particularly to lubricate the worm 37 on the shaft within said housing. The housing 36 is removed in the showing in Fig. 2 in order to clearly illustrate the worm 37. Means for lubricating the housing 36 externally of the casing is seen at 38. It will be noted that the shaft 33 extends externally of the casing terminating in a square or angular end 39, whereby a crank or other tool can be utilized to turn the shaft manually whenever desired.

On the shaft 30 is arranged a worm gear 40 which meshes with the worm 37. To the worm gear 40 is secured a cam segment 41 having a raised surface 42 which extends between the positions 43—44, note Fig. 1. At the ends of the surface 43 are bevelled surfaces 45 and 46, the cam 41 controlling operation of a plunger key pin 47, note Fig. 2. The pin 47 is mounted in a bushing 48 secured in the top wall 25, the pin carrying at its lower end, a ball 49 which operates upon the cam 41 to control movement of the pin 47 into and out of a series of circumferentially spaced apertures or sockets 50 in an index plate 51 of a machine. The plate 51 is mounted for free rotation around a reduced end 27' of the shaft 27 in moving a workpiece or a series of workpieces on the plate 51 with respect to a forming tool of a machine. In Fig. 4 of the drawing, an upper portion of a tool is diagrammatically seen at 52.

In Fig. 2, the pin 47 is shown supported on the raised platform 42, with the pin engaging the recess or socket 50 to key the plate 51 against rotation. In this position, a spring 53 arranged around the bushing 48 has been compressed, the plunger pin carrying at its lower end a spring seat 54. Adjustably secured to the top plate 25 of the casing is a flange stop pin 55 which is disposed in close proximity to the bushing 48, so that the flange end of the pin is disposed beneath the spring seat 54. It will thus be seen that downward movement of the pin 47 is checked at a point where said pin disengages the plate 51. This construction will support the ball 53 at all times above the lowest end of the bevelled portions 45 and 46 so to be positioned to ride freely over said bevelled portions, while at the same time, keeping the ball 53 from frictional engagement with the upper surface of the gear 40.

Carried by and protruding from the lower surface of the worm gear 40 is a stud 56 upon which is mounted a roller 57, note Fig. 3. The roller 57 is adapted to enter successive notches 28' of the indexing element 28 in intermittent rotary shifting of the plate 51 for indexing work thereon. In Fig. 1 of the drawing, the roller 57 is shown in a position preparatory to entering the notch or recess 28" of the element 28, the plunger key pin 47 being still in the raised position. As the gear 40 is rotated, the drive pin of the gear represented by the stud 56 and the roller 57, will start to enter the recess 28 as and when the plunger key pin 47 has reached its lowermost position and disengaged the plate 51. Continuation of rotation of the gear 40 will cause the element 28 to be rotated one step, at which time, the said driving pin will move out of the recess 28' and the key pin 47 will again be moved into the raised position on the surface 42 of the cam to again lock the plate 51.

Considering Fig. 2 of the drawing, it will appear that the recess 50 is alined with a bushing 58 having a lower bevelled surface 59 in the bore thereof and the upper end of the pin 47 is bevelled, as seen at 47' to facilitate free entrance of the pin into the bushing 58, while at the same time, forming a close fit in said bushing for positive alinement of a workpiece on the plate 51 with respect to the forming tool.

While the fitting, above described, is snug, sufficient celarance is provided to facilitate disengagement by action of the spring 53, which withdraws the key pin 47 from the plate 51, as will be apparent. Supported in conjunction with the micro-switch 21 on a bracket 60, is a pivoted arm 61, carrying at its free end a roller 62. Suitable means will be provided to maintain the arm 61 and roller 62, such for example, as a spring, not shown, in the inoperative position, or in other words, with the roller 62 in the path of stationary movement of the roller 57 on the drive pin construction. It will thus be seen that as said drive pin passes the roller 62, the arm 61 is swung to the right, as seen in Fig. 4, to actuate a switch element 21' of the micro-switch to actuate the switch for purposes later described. This actuation takes place just as the ball 49 of the pin 47 reaches the upper surface 42 of the cam 41. It will be understood in this connection that a slight continued rotation of the parts will prevail, until the electric motor stops, so that the position, as seen in Fig. 1, may be regarded as the rest or stop position of the motor, from which a cycle of operations can be described.

One side wall of the casing has a suitable fitting 63 through which circuit wires, diagrammatically seen at 64 are admitted into the box 17. These wires, from a source of electric supply, are diagrammatically seen at 64' and 64", in Fig. 4 of the drawing. In this figure, the various mechanisms of the index fixture are diagrammatically shown without regard for relative positions thereof, one with respect to the other. The tool 52 has a trip arm 52', diagrammatically shown, for actuating a micro-switch 65.

In the diagrammatic sketch, 66 represents a foot or hand switch, controlling the machine operation, and at 67 is a suitable switch solenoid mechanism used to control spindle or tool actuation. Tracing the circuit, it will appear that the wire 64' extends to a solenoid actuated switch arm 68, actuated by a solenoid 69 in the relay mechanism 18. The wire 64' also extends to the control switch 66 and to the unit 67. From the latter, a wire 70 extends to a contact 71 in the micro-switch mechanism 21. Normally the switch arm 72 of the micro-switch mechanism is in engagement with a contact 73, which leads to a contact plate 74 of the relay mechanism 18. Also in this circuit is a wire 75 which goes to the solenoid 69 and then to a circuit wire 76 which extends to the micro-switch 65 and also to a circuit wire 77 having a contact 78 adapted to be engaged by the contact plate 68 and also extending to the capacitor 13. From the capacitor 13, is a wire 79, which extends to the electric motor, another wire 77' extending from the wire 77 to the motor and from the motor is a wire 80, which extends to a contact 81 of the relay.

It will be understood that in actuation of the solenoid 69, the circuits are completed through the plate 68 and contact 78 and the plate 74 and contact 81. The indexer is automatically actuated in the following manner, assuming that the parts are in the position, as seen in Fig. 1, and operation is being performed upon the workpiece and the tool 52 or the spindle supporting the same is being moved into raised position out of engagement with the workpiece.

When the arm 52' strikes the micro-switch 65 to actuate the switch, this operation will close the circuit to the relay, thus putting the electric motor 22 into operation through the capacitor 13, which automatically puts the drive unit 31 into operation. In this operation, the key pin 47 will be first released from engagement with the plate 51, then the plate will be rotated one step, controlled by the feed motion of the geneva element 28 employed, and as this operation is completed and the pin 47 again moved into another key socket of the plate 51, the arm 61 is tripped, as above stated, to actuate the switch elements 21' of the micro-switch 21, causing the contact 72 to move into engagement with the contact 71, thus closing the circuit to the control switch 67 to again put the machine driving the tool 52 into operation. In the movement of the contact 72 into engagement with the contact 71, circuit is broken through the contact 73, thus automatically breaking the motor circuit, causing the motor to come at rest, whereupon the contact 72 is again moved into the closed circuit position with the contact 73, preparatory to the next descending operation of the tool 52. In other words, when the tool agains reaches its raised position, the micro-switch 65 will again be actuated to repeat the above described operation. Control through the switch 66 may be automatic, or this switch can be manually operated in each intermittent actuation of the element 22, depending entirely upon the type of work being performed on the machine or the degree of automatic operation which may be required.

It will be apparent that my improved apparatus or index fixture can be utilized in connection with machines of any type or kind for intermittent rotary feed of workpieces of any type or kind, regardless of the manner of performing operations thereon. In other words, a machine of this kind can be utilized where operations on the workpiece are performed by hand, in which event, suitable controls will be provided for intermittent actuation of the motor and feed of the work supporting table or plate 51.

Having fully described my invention, what I claim as new and desire to secure by Letters Patent is:

1. An index fixture of the character described comprising a casing, a table mounted for intermittent rotary movement on said casing, an indexing mechanism within the casing for intermittently actuating said table and to key the table in a plurality of indexing positions, said indexing mechanism including an electric motor, means comprising a switch automatically actuated by said indexing mechanism to break the circuit to said motor in intermittently stopping actuation of said mechanism, means comprising a switch externally of the casing for completing the circuit to said motor to actuate said indexing mechanism, the table keying means of said mechanism comprising a pin, a cam for moving said pin into operative position, tensional means for moving said pin into inoperative position and adjustable means adjacent the pin, checking movement of said pin into inoperative position.

2. An apparatus of the class described, comprising a casing having top and depending side walls, a motor supported on the top wall within said casing, a workpiece supporting plate rotatably mounted on the casing, said plate having a shaft extending downwardly into the casing, a geneva on the lower end of said shaft for imparting rotation to said plate, a drive unit for actuating said geneva, said unit including a worm gear and a cam portion, means comprising a worm driven from the motor shaft for engaging said worm gear for intermittently operating said geneva, a lock pin in the casing and movable over said cam portion, means yieldably supporting said pin in engagement with said cam portion, said cam portion positively moving said pin into operative position with respect to said plate in intermittently retaining the plate in predetermined position, said first named means including a stud on said worm gear adapted to engage and drive said geneva, and means comprising a switch in said casing and in electric circuit with said motor and actuated by said unit to control intermittent drive of the unit.

3. An apparatus of the class described, comprising a casing having top and depending side walls, a motor supported on the top wall within said casing, a workpiece supporting plate rotatably mounted on the casing, said plate having a shaft extending downwardly into the casing, a geneva on the lower end of said shaft for imparting rotation to said plate, a drive unit for actuating said geneva, said unit including a worm gear and a cam portion, means comprising a worm driven from the motor shaft for engaging said worm gear for intermittently operating said geneva, a lock pin in the casing and movable over said cam portion, means yieldably supporting said pin in engagement with said cam portion, said cam portion positively moving said pin into operative position with respect to said plate in intermittently retaining the plate in predetermined position, said first named means including a stud on said worm gear adapted to engage and drive said geneva, means comprising a switch in said casing and in electric circuit with said motor and actuated by said unit to control intermittent drive of the unit, and adjustable means limiting movement of said lock pin into inoperative position with respect to said plate.

4. An indexing fixture of the character described, comprising a casing having top and depending side walls housing the operative parts of the fixtures, a shaft rotatably mounted in and protruding through the top wall and extending downwardly into the casing, a workpiece supporting plate fixed to the shaft adjacent the top wall, a key pin slidably mounted on said top wall, a drive unit mounted in the casing, said unit comprising an electric motor, a worm shaft driven by the motor through a flexible coupling, a worm on said shaft, a worm gear rotatable on said first named shaft and operatively engaging and driven by said worm, a drive pin on said worm gear, said first named shaft having, within the casing, an element fixed thereto actuated by said drive pin to intermittently rotate said plate a predetermined part of a revolution, and means comprising a switch in said casing automatically actuated by said drive unit for breaking the circuit to the electric motor upon completion of the actuation of said element by said pin.

5. An indexing fixture of the character described, comprising a casing having top and depending side walls housing the operative parts of the fixtures, a shaft rotatably mounted in and protruding through the top wall and extending downwardly into the casing, a workpiece supporting plate fixed to the shaft adjacent the top wall, a key pin slidably mounted on said top wall, a drive unit mounted in the casing, said unit comprising an electric motor, a worm shaft driven by the motor through a flexible coupling, a worm on said shaft, a worm gear rotatable on said first named shaft and operatively engaging and driven by said worm, a drive pin on said worm gear, said first named shaft having, within the casing, an element fixed thereto actuated by said drive pin to intermittently rotate said plate a predetermined part of a revolution, means comprising a switch in said casing automatically actuated by said drive unit for breaking the circuit to the electric motor upon completion of the actuation of said element by said pin, and said last named means comprising a switch actuating arm adjacent said switch and operated by the drive pin of said unit.

6. An indexing fixture of the character described, comprising a casing having top and depending side walls housing the operative parts of the fixtures, a shaft rotatably mounted in and protruding through the top wall and extending downwardly into the casing, a workpiece supporting plate fixed to the shaft adjacent the top wall, a key pin slidably mounted on said top wall, a drive unit mounted in the casing, said unit comprising an electric motor, a worm shaft driven by the motor through a flexible coupling, a worm on said shaft a worm gear rotatable on said first named shaft and operatively engaging and driven by said worm, a drive pin on said worm gear, said first named shaft having, within the casing, an element fixed thereto actuated by said drive pin to intermittently rotate said plate a predetermined part of a revolution, means comprising a switch in said casing automatically actuated by said drive unit for breaking the circuit to the electric motor upon completion of the actuation of said element by said pin, switch means externally of said casing in circuit with said electric motor for completing circuit to the motor in controlling intermittent drive of said unit, said last named means including a manually actuated switch, an automatically actuated switch, and means in circuit with the first named switch to automatically control actuation of the mechanism movable relatively to said plate.

7. An indexing fixture of the character described, comprising a casing having top and depending side walls housing the operative parts of the fixtures, a shaft rotatably mounted in and protruding through the top wall and extending downwardly into the casing, a workpiece supporting plate fixed to the shaft adjacent the top wall, a key pin slidably mounted on said top wall, a drive unit mounted in the casing, said unit comprising an electric motor, a worm shaft driven by the motor through a flexible coupling, a worm on said shaft, a worm gear rotatable on said first named shaft and operatively engaging and driven by said worm, a drive pin on said worm gear, said first named shaft having, within the casing, an element fixed thereto actuated by said drive pin to intermittently rotate said plate a predetermined part of a revolution, means comprising a switch in said casing automatically actuated by said drive unit for breaking the circuit to the electric motor upon completion of the actuation of said element by said pin, said worm shaft protruding through a wall of the casing and having means facilitating manual rotation thereof, and said casing having means for supporting the same in predetermined fixed position.

MELVIN H. EMRICK.

REFERENCES CITED

The following references are of record in the file of this patent:

UNITED STATES PATENTS

| Number | Name | Date |
|---|---|---|
| 2,271,848 | Tcimpidis | Feb. 3, 1942 |
| 2,290,590 | Hawley et al. | July 21, 1942 |